United States Patent
Mark

(10) Patent No.: US 10,884,871 B2
(45) Date of Patent: Jan. 5, 2021

(54) SYSTEMS AND METHODS FOR COPYING AN OPERATING SOURCE VOLUME

(71) Applicant: Datto, Inc., Norwalk, CT (US)

(72) Inventor: Stuart Mark, Chappaqua, NY (US)

(73) Assignee: DATTO, INC., Norwalk, CT (US)

(*) Notice: Subject to any disclaimer, the term of this patent is extended or adjusted under 35 U.S.C. 154(b) by 89 days.

(21) Appl. No.: 16/055,347

(22) Filed: Aug. 6, 2018

(65) Prior Publication Data

US 2019/0042373 A1 Feb. 7, 2019

Related U.S. Application Data

(60) Provisional application No. 62/541,952, filed on Aug. 7, 2017.

(51) Int. Cl.
*G06F 11/14* (2006.01)
*G06F 3/06* (2006.01)
*G06F 11/20* (2006.01)

(52) U.S. Cl.
CPC .......... *G06F 11/1464* (2013.01); *G06F 3/061* (2013.01); *G06F 3/064* (2013.01); *G06F 3/065* (2013.01); *G06F 3/067* (2013.01); *G06F 11/1451* (2013.01); *G06F 11/2064* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 6,785,786 B1* | 8/2004 | Gold | G06F 11/1469 711/162 |
| 9,690,666 B1* | 6/2017 | Shembavnekar | G06F 11/1451 |
| 2009/0037680 A1 | 2/2009 | Colbert et al. | |

(Continued)

FOREIGN PATENT DOCUMENTS

WO WO-2016/205560 12/2016

OTHER PUBLICATIONS

Stender et al., "Loosely Time-Synchronized Snapshots in Object-Based File Systems," 29th IEEE International Performance Computing and Communications Conference (IPCCC 2010), 10 pages (2010).

(Continued)

*Primary Examiner* — William E. Baughman
(74) *Attorney, Agent, or Firm* — Fay Sharpe LLP

(57) ABSTRACT

The present disclosure is directed at systems and methods for copying a source volume to a target volume. The disclosed systems/methods facilitate copying the source volume to the target volume while an operating system is configured to write to the source volume, while ensuring that the resulting copy in the target volume represents a crash-consistent state of the source volume at a single point in time. According to some embodiments, the disclosed systems and methods reduce the amount of time that the operating system writing to the source volume spends in copy-on-write mode. The disclosed systems/methods can decrease the performance burden on the operating system (e.g., free up processing resources at the operating system for other tasks), while also decreasing the amount of memory required for the copying process.

25 Claims, 7 Drawing Sheets

(56) References Cited

U.S. PATENT DOCUMENTS

| | | | |
|---|---|---|---|
| 2010/0100696 A1* | 4/2010 | Suzuki | G06F 3/0625 |
| | | | 711/162 |
| 2011/0282841 A1* | 11/2011 | Saika | G06F 3/0608 |
| | | | 707/649 |
| 2012/0159475 A1 | 6/2012 | Abbondanzio et al. | |
| 2012/0304170 A1 | 11/2012 | Morgan | |
| 2013/0226870 A1* | 8/2013 | Dash | G06F 3/0619 |
| | | | 707/634 |
| 2013/0262862 A1 | 10/2013 | Hartley | |
| 2014/0098671 A1 | 4/2014 | Raleigh et al. | |
| 2014/0281355 A1 | 9/2014 | Trieu | |
| 2017/0293628 A1* | 10/2017 | Adler | G06F 11/1464 |

OTHER PUBLICATIONS

"Create a reliable backup," © 2003-2018 Acronis International GmbH (8 pages) <https://www.acronis.com/en-us/personal/computer-backup/>.

Gildred, "The Best Image-Based Backup and Cloning Software of 2018," Cloudwards.net, last updated Feb. 22, 2018, 40 pages <https://www.cloudwards.net/best-disk-imaging-software/>.

Posey, "Backup challenges: Protecting large volumes of data," TechTarget, 8 pages (Apr. 2014) <https://searchdatabackup.techtarget.com/feature/Backup-challenges-Protecting-large-volumes-of-data>.

\* cited by examiner

SYSTEMS AND METHODS FOR COPYING AN OPERATING SOURCE VOLUME

CROSS-REFERENCE TO RELATED APPLICATIONS

This Application claims the benefit of U.S. Provisional Application 62/541,952 filed on Aug. 7, 2017, the entire contents of which are incorporated herein by reference in their entirety.

FIELD OF THE INVENTION

The present innovations generally address methods and systems for copying a source logical volume to a target logical volume. In some embodiments, the present innovations can facilitate copying said source volume while an operating system is still actively performing writes to the source volume.

BACKGROUND

Logical volumes can be written to by one or more operating systems. These logical volumes can also be copied for multiple purposes, such as for backup of critical data or applications, or to make the contents of the source logical volume available at another time or location.

One way to create a copy of a source logical volume that is crash-consistent is to suspend all writes to the source volume while the copying process is ongoing. This can be achieved by instructing an operating system managing the source logical volume to stop writing to the source volume while the source volume is being copied to a target volume. However, for large logical volumes, this can impose an undesirable burden on performance since the time required to copy the source volume may be lengthy. For instance, the copying procedure may take hours, during which the source volume may be unable to accept new write requests.

Another way to create a copy of a source logical volume that is crash consistent is to cause the operating system managing the source volume to enter a copy-on-write mode before the copying process starts, and to remain in the copy-on-write mode until the source volume is completely copied to the target volume. A source volume can be considered to comprise multiple "blocks" of storage, wherein each block stores a certain amount of data. When in copy-on-write mode, the operating system intercepts every write instruction to the source volume before the write occurs. The operating system then determines, for every write, whether the write would (if allowed to proceed) modify a block of the source volume that has not yet been copied to the target volume. If the to-be-modified block has already been copied to the target volume, the operating system can allow the write to proceed. If the to-be-modified block has not yet been copied, the operating system can copy the original, un-modified contents of the to-be-modified block to a "copy-on-write file" or "CoW file", thereby preserving the original state of the to-be-modified block. After the original contents of the to-be-modified block have been safely copied to the CoW file, the operating system can allow the write instruction to modify the block.

At a later time, when the process copying the source volume to the target volume attempts to copy the modified block, the copying process can be re-directed to copy from the portion of the CoW file that stores the original contents of the modified block. In this way, the copy of the source volume that is copied to the target volume remains crash consistent because it reflects the state of the source volume at the instant the operating system entered copy-on-write mode (i.e., at the beginning of the copy process). A copy of a source logical volume that is crash consistent is typically associated with a time designation, where the time designation refers to a time that the copy process commenced, at which time the copy is crash consistent.

However, causing the operating system to enter a copy-on-write mode can also impact the performance and responsiveness of the operating system and the source volume. Requiring the operating system to examine every write instruction to the source volume, and potentially copy blocks of the source volume to the CoW file, can tie up scarce computational resources needed for other operating system processes. Furthermore, copy-on-write mode can decrease the perceived speed with which the source volume responds to write instructions. If the copying process takes a long time, and if the operating system makes many writes to the source volume during the copying process, a large amount of storage may need to be reserved for the CoW file to store the large number of blocks that are modified. In some systems, this storage for the CoW file must be reserved in advance, even though the operating system cannot predict exactly how long the copying process will take, or how many writes will need to be made to the source volume during the copying process. If the storage reserved for the CoW file is too small to hold all the blocks that were modified during the copying process, the entire copying process may fail. In these cases, the copying process may need to be re-started from the beginning. If the storage reserved for the CoW file is too large, less memory storage space is available for other data and/or applications.

These problems are exacerbated when copying large amounts of data to remote sites via network connections, such as Internet communication to the cloud. Communication over the Internet can be a relatively slow process compared to processes such as computation, file edits, and local copying. Such communication lengthens the copying process leading to more time for growth of the CoW file and presents problems with data transmission interruptions. Accordingly, systems and methods for copying data and data volumes are needed to address the shortcomings of current approaches.

SUMMARY

The present disclosure is directed at systems and methods for copying an operating source volume. For example, these systems and methods may be used to take a "snapshot" of an operating source volume, wherein the snapshot preserves a crash-consistent state of the source volume. According to some embodiments, a crash-consistent state of the source volume can reflect a state of the source volume as it existed at a single point in time. A crash-consistent state can also refer to a state of data on a volume such that if a computer managing the volume were to lose power or crash and be rebooted, the data on the volume can be operated on by the computer's operating system without error or data corruption. In some embodiments, if data in a crash-consistent state is restored to a computer, the operating system should be able to operate on the data as if the operating system had been powered off and on again.

According to one aspect, the present disclosure is directed at a method for copying a source volume comprising multiple blocks to a target volume while an operating system is configured to write to the source volume. The method can comprise (a) designating a set of one or more blocks to be copied from the source volume to the target volume; (b) copying the designated set of one or more blocks from the source volume to the target volume while the operating system is configured to write to the source volume; (c) identifying blocks of the source volume that were written to by the operating system while the operating system was configured to write to the source volume during step (b); (d) if one or more blocks were identified in step (c), comparing an aggregate size of the identified one or more blocks to a threshold, wherein: (d)(i) if the aggregate size is greater than or equal to the threshold: changing the designated set of one or more blocks to be copied from the source volume to the target volume to include the identified one or more blocks, and repeating steps (b), (c), and (d); (d)(ii) if the aggregate size is below the threshold: causing the operating system to enter a copy-on-write mode, in which contents of a block of the source volume that is targeted by a write instruction from the operating system are preserved in a copy-on-write file before the write instruction modifies the contents of the targeted block, and bringing the target volume into a state consistent with a state of the source volume at the time the copy-on-write mode was entered.

In some embodiments, the method the method includes changing the designated set of one or more blocks to be copied from the source volume to the target volume in (d)(i) to include only the identified one or more blocks.

In some embodiments, the method can conclude if no blocks were identified in step (c).

In some embodiments, designating the set of one or more blocks to be copied from the source volume to the target volume in step (a) comprises designating at least one of (i) all allocated blocks in the source volume, and (ii) all blocks in the source volume.

In some embodiments, the operating system can refrain from entering the copy-on-write mode during steps (a), (b), (c), and (d)(i).

In some embodiments, the method can further comprise receiving, during step (b), an indication that the operating system has written to a block of the source volume; determining, during step (b), whether the written-to block has already been copied to the target volume; if the written-to block has already been copied to the target volume, adding an identifier corresponding to the written-to block to a list of modified blocks; and if the written-to block has not already been copied to the target volume, refraining from adding the identifier corresponding to the written-to block to the list of modified blocks, wherein step (c) comprises evaluating said list of modified blocks. In some embodiments, the evaluating said list of modified blocks includes identifying blocks that are to be copied. According to some embodiments, the blocks that are to be copied are from important files. These files may be identified based on a desired configuration. Important files may include but are not limited to files such as documents or system settings. Files that are not to be copied may include less important files, such as temp files, blocks that have been deleted, browser histories, or other files that a system operator may deem unimportant based on a desired configuration.

In some embodiments, the method can further comprise receiving, during step (b), an instruction from the operating system to write to a block of the source volume; and adding an identifier corresponding to the written-to block to a list of modified blocks, wherein step (c) comprises evaluating said list of modified blocks.

In some embodiments, the threshold can be determined based on a maximum number of blocks that may be transferred from the source volume to the target volume within a target maximum time.

In some embodiments, the threshold can be determined based on a pre-defined proportion of a total size of at least one of the source volume and the target volume.

In some embodiments, the aggregate size of the identified one or more blocks can be a numerical count of the identified one or more blocks, and the threshold comprises a number of blocks.

In some embodiments, step (d)(ii) can comprise copying the identified one or more blocks from the source volume to the target volume while the operating system is in the copy-on-write mode.

In some embodiments, the source volume can be a client device and the target volume can be a backup aggregator at a site local to the client device.

In some embodiments, the source volume can be a client device and the target volume can be a storage server at a cloud storage center remote from the client device.

In some embodiments the source volume can be an aggregator and the target volume can be a cloud storage center remote from the client device.

In some embodiments the source volume and target device are volumes contained within the same device, such as a client computer or other computing device.

In another aspect, the present disclosure is directed at a computer system for copying a source volume comprising multiple blocks to a target volume while an operating system is configured to write to the source volume. The system can comprise: the source volume; a communication interface communicably coupled to the target volume; and at least one processor configured to execute computer-readable instructions which, when executed, cause the at least one processor to: (a) designate a set of one or more blocks to be copied from the source volume to the target volume; (b) copy the designated set of one or more blocks from the source volume to the target volume while the operating system is configured to write to the source volume; (c) identify blocks of the source volume that were written to by the operating system while the operating system was configured to write to the source volume during step (b); (d) if one or more blocks were identified in step (c), comparing an aggregate size of the identified one or more blocks to a threshold, wherein: (d)(i) if the aggregate size is greater than or equal to the threshold: change the designated set of one or more blocks to be copied from the source volume to the target volume to include the identified one or more blocks, and repeating steps (b), (c), and (d); (d)(ii) if the aggregate size is below the threshold: cause the operating system to enter a copy-on-write mode, in which contents of a block of the source volume that is targeted by a write instruction from the operating system are preserved in a copy-on-write file before the write instruction modifies the contents of the targeted block, and bring the target volume into a state consistent with a state of the source volume at the time the copy-on-write mode was entered.

In some embodiments, the changed designated set of one or more blocks to be copied from the source volume to the target volume in (d)(i) includes only the identified one or more blocks.

In some embodiments, the at least one processor can be configured to designate the set of one or more blocks to be copied from the source volume to the target volume in step (a) by being configured to designate at least one of (i) all allocated blocks in the source volume, and (ii) all blocks in the source volume.

In some embodiments, the at least one processor can be configured to refrain from entering copy-on-write mode during steps (a), (b), (c), and (d)(i).

In some embodiments, the at least one processor can be further configured to: receive, when executing step (b), an indication that the operating system has written to a block of the source volume; determine, when executing step (b), whether the written-to block has already been copied to the target volume; if the written-to block has already been copied to the target volume, add an identifier corresponding to the written-to block to a list of modified blocks; and if the written-to block has not already been copied to the target volume, refraining from adding the identifier corresponding to the written-to block to the list of modified blocks, wherein step (c) comprises evaluating said list of modified blocks.

In some embodiments, the at least one processor can be further configured to: receive, when executing step (b), an instruction from the operating system to write to a block of the source volume; and add an identifier corresponding to the written-to block to a list of modified blocks, wherein step (c) comprises evaluating said list of modified blocks.

In some embodiments, the threshold used by the at least one processor can be determined based on a maximum number of blocks that may be transferred from the source volume to the target volume within a target maximum time.

In some embodiments, the threshold used by the at least one processor can be determined based on a pre-defined proportion of a total size of at least one of the source volume and the target volume.

In some embodiments, the aggregate size of the identified one or more blocks used by the at least one processor can be a numerical count of the identified one or more blocks, and the threshold can comprise a number of blocks.

In some embodiments, the at least one processor can be configured to execute step (d)(ii) by being configured to copy the identified one or more blocks from the source volume to the target volume while the operating system is in the copy-on-write mode.

In some embodiments, the source volume of the computer system can be a client device and the target volume can be a backup aggregator at a site local to the client device.

In some embodiments, the source volume of the computer system can be a client device and the target volume can be a storage server at a cloud storage center remote from the client device.

In another aspect, the present disclosure is directed at a method for copying a source volume comprising multiple blocks to a target volume, the method comprising: (a) designating a set of one or more blocks to be copied from the source volume to the target volume; (b) copying the designated set of one or more blocks from the source volume to the target volume while an operating system is configured to write to the source volume; (c) identifying blocks of the source volume that were written to by the operating system while the operating system was configured to write to the source volume during step (b); and (d) comparing an aggregate size of the identified one or more blocks to a threshold, wherein: (d)(i) if the aggregate size is greater than or equal to the threshold: changing the designated set of one or more blocks to be copied from the source volume to the target volume to include the identified one or more blocks, and repeating steps (b), (c), and (d).

In some embodiments, the method includes changing the designated set of one or more blocks to be copied from the source volume to the target volume in step (d)(i) to include only the identified one or more blocks.

In some embodiments, step (d) can further comprise: (d)(ii) if the aggregate size is below the threshold: causing the operating system to enter a copy-on-write mode, in which contents of a block of the source volume that is targeted by a write instruction from the operating system are preserved in a copy-on-write file before the write instruction modifies the contents of the targeted block, and bringing the target volume into a state consistent with a state of the source volume at the time the copy-on-write mode was entered.

In another aspect, the present disclosure is directed at a computer system for copying a source volume comprising multiple blocks to a target volume, the system comprising: the source volume; a communication interface communicably coupled to the target volume; and at least one processor configured to execute computer-readable instructions which, when executed, cause the at least one processor to: (a) designate a set of one or more blocks to be copied from the source volume to the target volume; (b) copy the designated set of one or more blocks from the source volume to the target volume while an operating system is configured to write to the source volume; (c) identify blocks of the source volume that were written to by the operating system while the operating system was configured to write to the source volume during step (b); and (d) comparing an aggregate size of the identified one or more blocks to a threshold, wherein: (d)(i) if the aggregate size is greater than or equal to the threshold: change the designated set of one or more blocks to be copied from the source volume to the target volume to include the identified one or more blocks, and repeating steps (b), (c), and (d).

In some embodiments, the at least one processor can be configured to execute step (d) by further being further configured to: (d)(ii) if the aggregate size is below the threshold: cause the operating system to enter a copy-on-write mode, in which contents of a block of the source volume that is targeted by a write instruction from the operating system are preserved in a copy-on-write file before the write instruction modifies the contents of the targeted block, and bring the target volume into a state consistent with a state of the source volume at the time the copy-on-write mode was entered.

BRIEF DESCRIPTION OF THE DRAWINGS

For a more complete understanding of the present disclosure, reference is now made to the following descriptions taken in conjunction with the accompanying drawings, in which.

DETAILED DESCRIPTION

It is an objective of the disclosed systems and methods to address the performance problems discussed above. In particular, in some embodiments, the disclosed systems and methods may allow a crash-consistent state of a source volume to be copied to a target volume even as an operating system is actively writing to the source volume. The disclosed systems and methods may also accomplish this while decreasing the amount of time the operating system spends in copy-on-write mode. Decreasing the amount of time spent in copy-on-write mode can, in turn, improve the performance of the operating system by making it more responsive to user commands. Furthermore, decreasing the amount of time spent in copy-on-write mode can reduce the amount of storage that must be reserved for a CoW file, thus freeing up additional storage resources for other data or applications. Decreasing the amount of storage required for a CoW file can also reduce the likelihood that a copy procedure fails because an insufficient amount of storage space was reserved for the CoW file at the beginning of the copy procedure. In some embodiments, the CoW file can be part of the source volume being copied. However, the CoW file does not have to be part of the source volume being copied, but can be a file stored outside of the source volume. The CoW file can also be stored on a separate part of a physical storage device (e.g., hard-drive) that holds all or part of the logical volume, or on an entirely separate physical storage device.

In some embodiments the CoW mode is not entered at the commencement of the copying process and is instead entered at a time later than the time that the copy process has commenced. Accordingly, crash consistent copy may be created with an associated time designation at a time the CoW mode is entered rather than at the commencement of the copying.

Figure 1A:
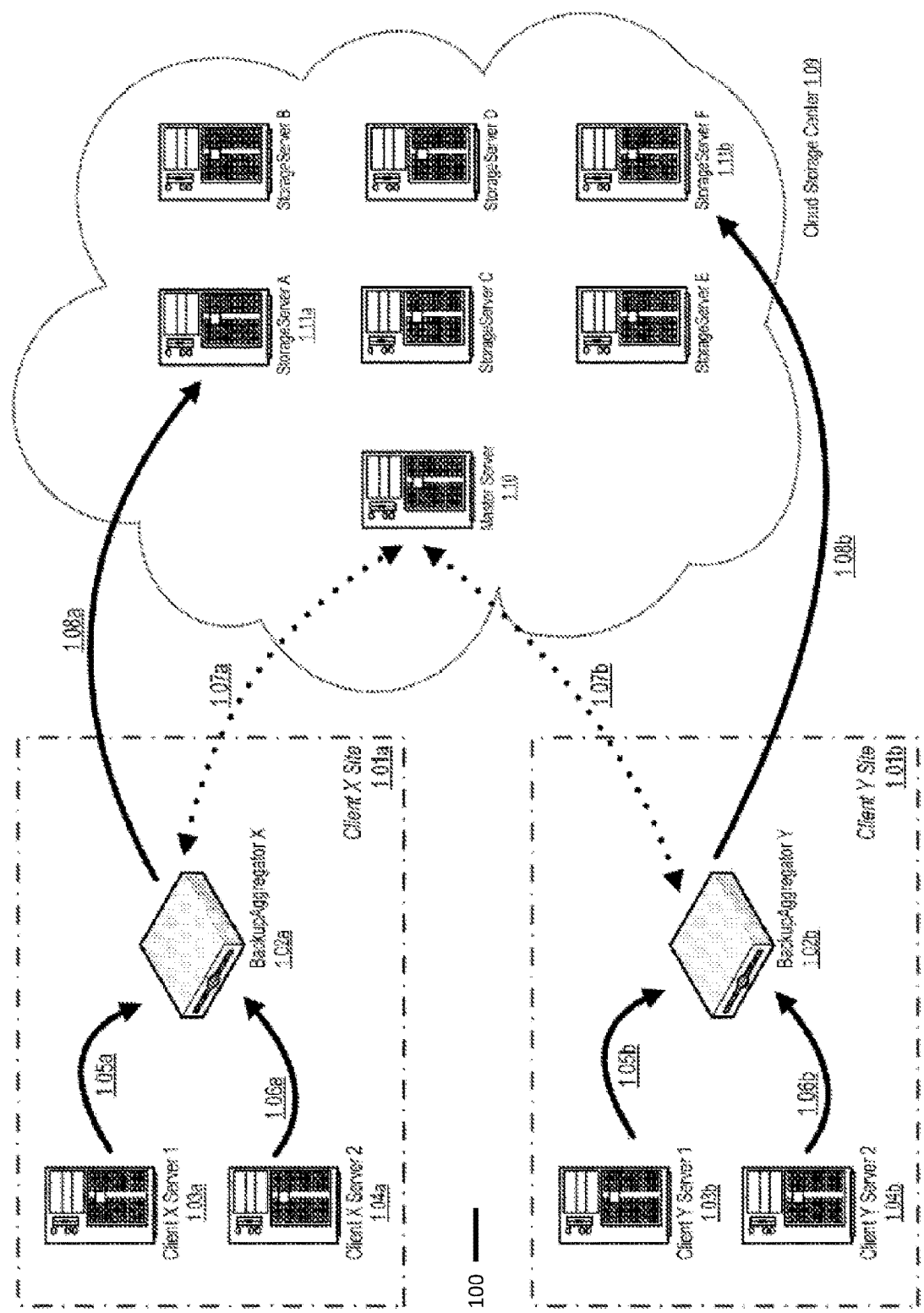
FIGS. 1A-1B are a block diagrams illustrating example aspects of backup networks, according to some embodiments.

FIG. 1A shows a block diagram illustrating example aspects of a backup network 100 that utilizes the disclosed systems and methods. In one embodiment, the backup network 100 may provide an image-based backup solution wherein a local device, e.g., a backup aggregator 102a, is responsible for and facilitates the aggregation of image-based backups from a plurality of client devices local to and/or in communication with the backup aggregator. For example, in one embodiment, a given client site, e.g., 101a, may have one or more backup aggregators in communication on a local area network, e.g., backup aggregator 102a. According to some embodiments, the devices may be in the same geographic site, campus. According to some embodiments, the client devices and backup aggregator are remote, for example, outside the local area network, geographic site, or campus. Client devices, which may be servers, workstations, laptops, and/or the like, e.g., 103a, 104a, may be in communication with backup aggregator 102a and periodically transfer (depicted as 105a, 106a) a representation of a block-level storage device to backup aggregator 102a. The backup aggregator may thereafter generate a snapshot of the received image backup file(s) according to a local backup schedule. The snapshot operation may be client device specific, such as for example a local backup snapshot policy that generates hourly backups for a mission-critical mail server while only generating daily snapshots of image backup files from a user's laptop. The backup network may also be configured such that the transfer of image-based backup files from client devices (such as servers, workstations, laptops, etc., described above) may differ from the local snapshot policy itself.

In one embodiment, backup aggregator 102a may maintain such a local backup policy while additionally maintaining a remote backup policy. The remote backup policy may be a backup policy maintained at the backup aggregator that determines how frequently the backup aggregator will synchronize certain image-based backup file snapshot data with remote cloud storage center 109. In one embodiment, backup aggregator 102a may coordinate the execution of its remote backup schedule (depicted as 107a) with a master server 110. The master server may receive from the backup aggregator an indicator of the backup aggregator's last known storage server pairing within the cloud storage center 109. A storage server, for example StorageServer A 111a, may be a server that is directly paired with the backup aggregator such that it is capable of receiving and applying to its own snapshot capable file system a received send file representing the file system differences between image-based file backups snapshotted at two different points in time.

In one embodiment, after coordinating with master server 110, a backup aggregator 102a may thereafter initiate a send file transfer operation (depicted as 108a), with its paired storage server 111a within the cloud storage center. In some embodiments, storage server 111a may itself have a paired or file system mirroring relationship with a second storage server. Such a backup network configuration may be useful in cases where the image-based backup snapshot history maintained on the backup aggregator would be advantageously stored on both the backup aggregator's paired server, e.g., 111a, and a secondary storage server located in a different geographical location. Such a configuration may enable recovery of cloud storage center stored image snapshot data even in scenarios where cloud storage center 109 is partially destroyed.

Furthermore, in one embodiment, the master server may direct the activity of multiple backup aggregators as well as manage or direct the pairing of backup aggregators with different storage server nodes within cloud storage center 109, e.g., StorageServer B, C, D, E, or F (StorageServer F 111b). It should be understood that the maintenance of the local or remote backup policy need not necessarily be performed by a backup aggregator device. For example, the master server or a storage server could instead maintain a backup policy associated with the backup aggregator. In such a configuration, the coordination of the backup aggregator with the master server may, for example, additionally comprise sending or receiving information about the currently active local or remote backup policy associated with the backup aggregator.

In some embodiments, each client device (e.g., 103a, 104a, 103b, 104b) can comprise a backup agent installed thereon to perform a backup or copying procedure. When the client device runs its backup agent, the backup agent may generate and send periodic backup files to a Backup Aggregator (e.g., Backup Aggregator X 102a). A periodic backup file may comprise an image-based backup. An image-based backup is a block-by-block copy of a portion of a hard-drive or logical volume. According to some embodiments, the image-based backup is of the allocated portion of a partially allocated hard-drive or logical volume or a portion thereof. According to some embodiments, the image-based backup is of portions of a hard-drive or logical volume that are selected by a user or system operator. According other embodiments, the image-based backup may be of a full hard-drive or logical volume. A block refers to a specific physical area on a hard-drive, or a specific subset of a logical volume, which may contain data. In some embodiments, a block (sometimes called a physical record) can comprise a sequence of bytes or bits, having a specific length called the block size. Therefore, an image-based backup represents the contents of a source hard-drive or logical volume, exactly as this content was stored on the source hard-drive or logical volume at a single point in time. This data can include data associated with an operating system, and data stored in the system along with structural information and application configurations. The source used to create the image backup file need not actually be a physical hard drive and may, for example, be a virtual hard disk or even another image backup file. The embodiments described herein may be utilized on backup files that are based on a different formatting scheme but otherwise lend themselves to processing by the described embodiments of the backup network. Once generated, block-level image backup files may serve as the basis for restoring a hard drive or logical volume to a substantially similar state as present at the time of the backup, in particular, at the time of entering the CoW mode. Image backup files may contain additional data elements such as file system metadata that was present on the source hard drive or logical volume, master boot records, partition information and/or the like. This manner of backup may be distinguished from what may be thought of as a "file/directory level" backup which merely duplicates the contents and location of files and/or directories contained on a hard drive without necessarily including additional metadata, file system data, etc.

Figure 1B:
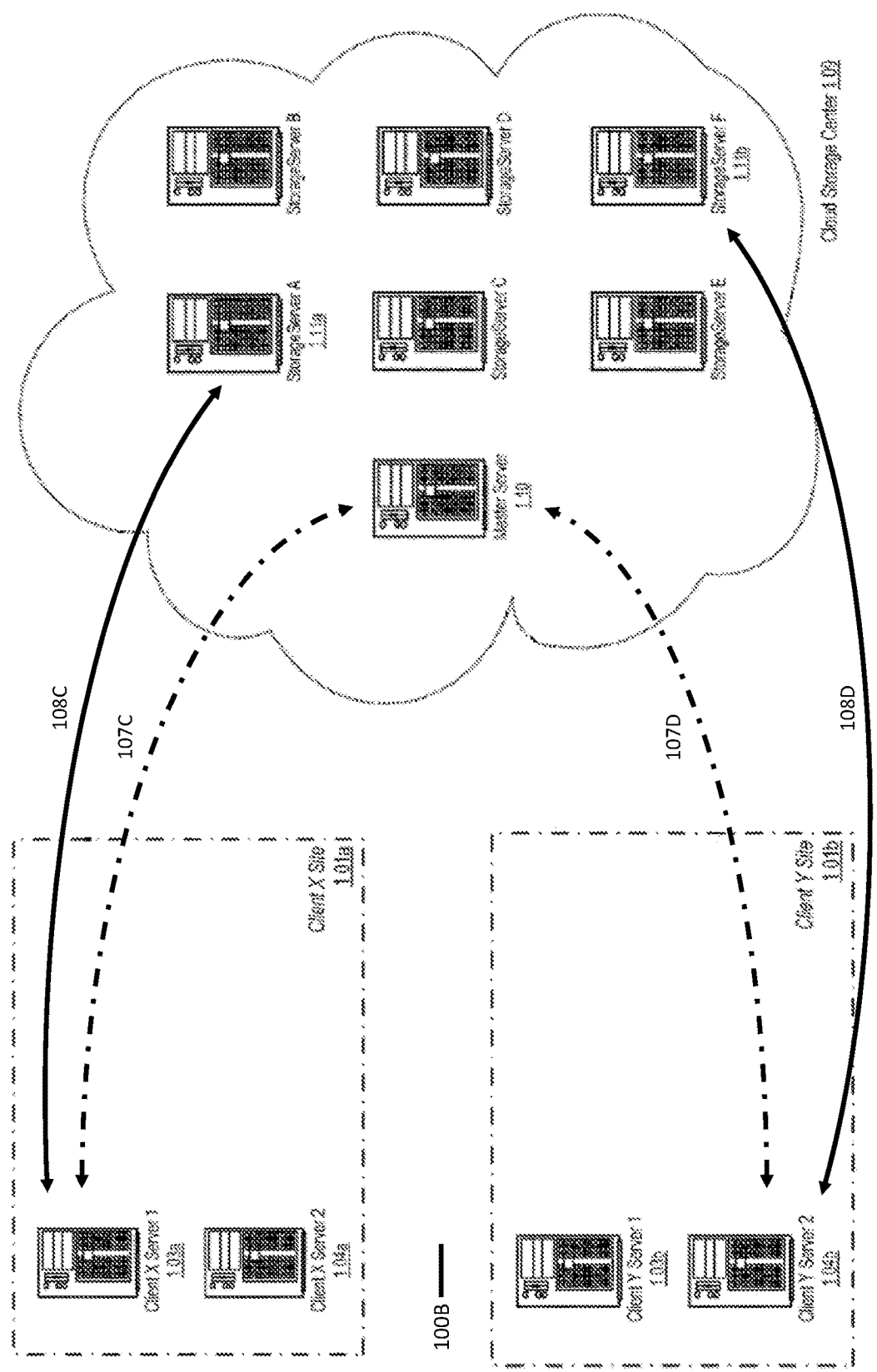

FIG. 1B shows a block diagram illustrating another exemplary embodiment of a backup network 100B that utilizes the disclosed systems and methods. In FIG. 1B, the backup network 100B may not include backup aggregators for some or all client sites (e.g., 101a, 101b). Instead, client devices (e.g., 103a, 104a, 103b, 104b) communicate directly with remote cloud storage center 109. In these embodiments, a backup agent installed on a client device (e.g., 103a) may communicate (e.g., 107C) with master server 110 in the cloud storage center 109 to coordinate the execution of its remote backup schedule. The master server may receive from the agent on the client device (e.g., 103a) an indicator of the client device's last known storage server pairing within the cloud storage center 109. For instance, the client device 103a may have been previously paired with Storage-Server A 111a. After coordinating with master server 110, the backup agent on the client device 103a may thereafter initiate a send file transfer operation, e.g., 108C, with its paired storage server 111a within the cloud storage center. Similarly, the backup agent on client device 104b may coordinate (e.g., 107D) the execution of its remote backup schedule with master server 110. If the client device 104b is paired with storage server 111b, the client device 104b may initiate a send file transfer operation, e.g., 108D, with its paired storage server 111b. The backup network 100B of FIG. 1B differs mainly from the backup network 100 of FIG. 1A in that client devices may communicate and transfer image-based backup files directly with cloud storage center 109, without the aid of a backup aggregator local to the client site 101a, 101b.

Figure 2:
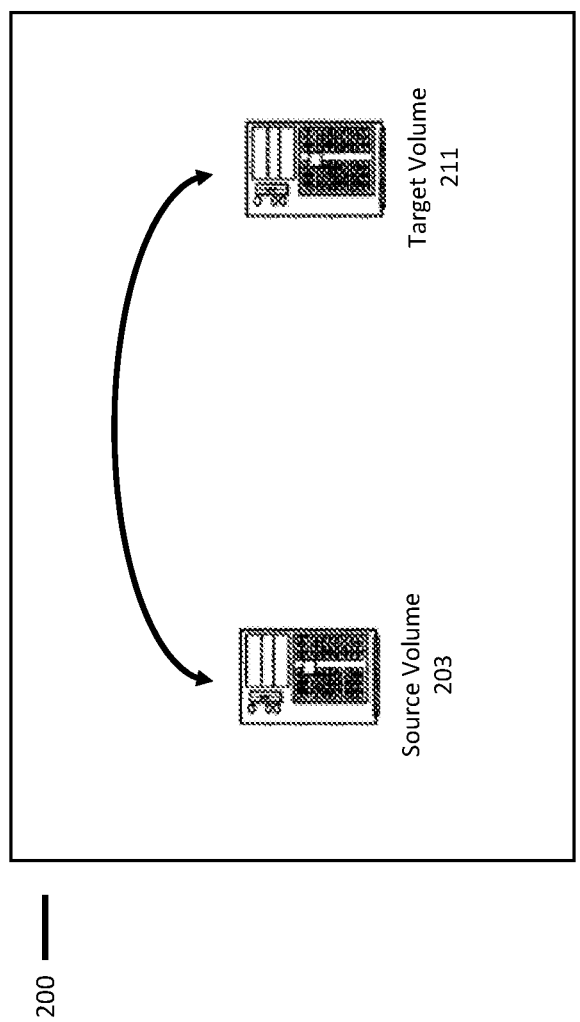
FIG. 2 is a block diagram illustrating an exemplary embodiment of a backup system, according to some embodiments.

FIG. 2 shows a block diagram illustrating an exemplary embodiment of a backup system that utilizes the disclosed systems and methods. In FIG. 2, the backup system 200 includes a source volume 203 and a target volume 211. The source volume 203 and the target volume 211 may be on the same device (for example, on the same client computer or computer device, such as two partitions of a single hard drive or on two different hard drives on the same device) or may be on different devices (for example two different server blades or two different servers in the same location or at different locations connected via a communications network).

The disclosed systems and methods for copying a crash-consistent state of a source volume to a target volume may be used in several places in the backup network 100 or 100B. For instance, the disclosed systems and methods may be used to copy data stored at a client device (e.g., 103a, 104a, 103b, 104b) to a backup aggregator (e.g., 102a, 102b) in backup network 100. Alternatively, or in addition, the disclosed systems and methods may be used to copy data stored at a client device (e.g., 103a, 104a, 103b, 104b) directly to a storage server (e.g., 111a, 111b) in the cloud storage center 109 in backup network 100B. The disclosed systems and methods may be particularly useful in the latter context because the time required to copy a source volume from a client device to a storage server in cloud storage center 109 may be longer than the time required to copy the same source volume to a backup aggregator local to the client device. If the time required to copy the source volume is longer, the disclosed systems and methods' ability to decrease the amount of time the client device's operating system stays in copy-on-write mode becomes particularly important. As discussed above, decreasing the amount of time the client device's operating system stays in copy-on-write mode can be desirable because this lessens the performance burden on the client device, and decreases the amount of storage that must be reserved in advance for a CoW file.

Figure 3:
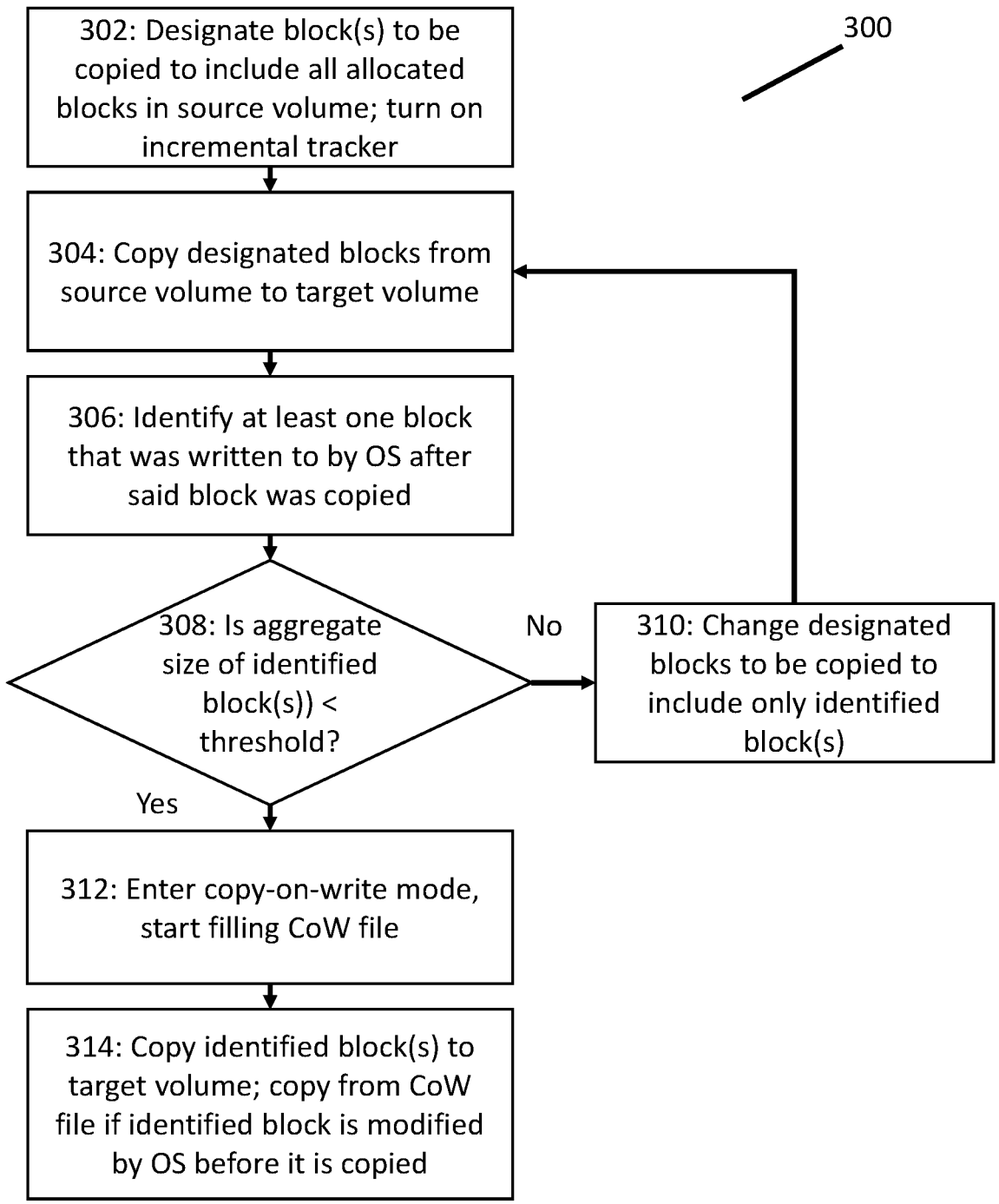
FIG. 3 is a flowchart depicting an exemplary general process for copying a source volume to a target volume, according to some embodiments.

FIG. 3 is a flowchart depicting an exemplary process 300 for copying a source volume to a target volume, according to some embodiments. As discussed above, the source volume may be managed by an operating system that continues to write to the source volume 302 during the copying process 300. There is no need to take the source volume offline while the copying process is ongoing. Process 300 may be used to copy a source volume at a client device (e.g., 103a, 104a, 103b, 104b) to a backup aggregator (e.g., 102a, 102b) in backup network 100. Alternatively, or in addition, process 300 may be used to copy a source volume at a client device (e.g., 103a, 104a, 103b, 104b) to a storage server (e.g., 111a, 111b) in cloud storage center 109.

In some embodiments, process 300 may maintain at least three separate data structures: (i) a list of blocks to be copied from the source volume to the target volume (designated Blocks_to_Copy in the discussion below), (ii) a list of blocks that were modified by an operating system (OS) (designated Changed_Blocks in the discussion below), and (iii) a copy-on-write file (designated CoW_File in the discussion below). If used, the purpose and operation of each data structure is explained in greater detail below. When process 300 first begins, each data structure Blocks_to_Copy, Changed_Blocks, and CoW_File can be initialized to a null value.

At step 302, process 300 designates blocks to be copied. In some embodiments the designated blocks to copy can include all allocated blocks in the source volume. In embodiments that use the data structure Blocks_to_Copy, this can be done by updating Blocks_to_Copy to include a list that identifies all allocated blocks in the source volume. Allocated blocks in the source volume can include blocks that have been identified by a file system on the source volume as containing useful data—unallocated blocks can include blocks in the source volume that do not store useful data. In other embodiments, step 302 can also simply designate all blocks in source volume (whether allocated or not) to be copied—this can be done by updating Blocks_to_Copy to include all blocks in the source volume (again, whether allocated or not). In other embodiments, the designated blocks to be copied may not include all allocated blocks. A set of excluded blocks from particular files may not be copied. For instance, certain files may not be advantageous to a back-up and restore application. Examples of such files include, but are not limited to or required to include, page files, swap files, hibernation files, files within a temp directory, old versions of operating systems, files that have been deleted but are still recoverable. Other files may be excluded as well, depending on the back-up and restore application. Excluding blocks from these files in the copying process can reduce the time to copy and reduce the data storage requirement.

At step 302, process 300 can cause the operating system to enter an incremental tracking mode. While in incremental tracking mode, the operating system can keep track of every write instruction that modifies a block of the source volume. In some embodiments, the incremental tracking mode can also keep track of the time at which each write instruction occurred, and/or the sequence in which the write instructions occurred. Unlike when the operating system is in copy-on-write mode, the incremental tracking mode does not attempt to copy to a CoW file the contents of blocks that are being written to. Instead, the incremental tracking mode keeps a running list of all blocks in the source volume that have been modified by write instructions since the tracker was turned on. Since the incremental tracking mode does not attempt to copy contents of blocks to a CoW file, the incremental tracking mode imposes a relatively small performance burden on the operating system managing the source volume.

At step 304, process 300 copies the designated blocks from the source volume to the target volume. In embodiments that use the data structure Blocks_to_Copy, this step can comprise copying each block in the source volume identified in Blocks_to_Copy to the target volume according to a predetermined sequence, until there are no more blocks left to copy in Blocks_to_Copy. In some embodiments, blocks are identified by a block number, and one example of a predetermined sequence is a numerically ascending order by block number. The predetermined sequence can also be based on physical locations of blocks on a memory device. For example, in some embodiments, each block may correspond to a physical location on a spinning optical or magnetic disk, wherein blocks are numbered according to the order of their physical locations on the disk. Physical storage devices that use spinning disks generally perform best when blocks are read sequentially in increasing numerical block order. Therefore, in some embodiments, the predetermined sequence may be arranged such that sequential or adjacent ranges of blocks are read in order from the block with the smallest block number to the block with the largest block number. Other types of physical storage devices may use solid state memory that uses different channels to read/write data in parallel. For these types of physical storage devices, the predetermined sequence may be arranged such that blocks are read according to a randomly determined sequence. Other types of sequences for reading blocks are also possible. Depending on the size of the source volume 302 and the available bandwidth between the source volume and the target volume, step 304 may take a considerable amount of time to complete (e.g., multiple minutes, hours, or even days). After all designated blocks have been copied from the source volume to the target volume, process 300 proceeds to step 306.

At step 306, process 300 identifies at least one block in the source volume that was written to by an operating system after said block was copied to the target volume. This can be done by evaluating records, logs, or data generated and/or modified by the operating system while in incremental tracking mode. For example, during execution of step 304, the incremental tracking mode could have determined whether each write by the operating system to the source volume is to a block of the source volume that has already been copied to the target volume, or has not been copied to the target volume. If the write is to a block of the source volume that has already been copied, the process 300 (while in incremental tracking mode) could add an identifier corresponding to the block of the source volume that was written to by the operating system to a running list of modified blocks. In some simpler embodiments, the incremental tracking mode could forego checking whether a written-to block has been copied to the target volume yet—instead, the mode could simply list all blocks that were written-to during execution of step 304. At step 306, the process of identifying blocks that were written to after said block was copied to the target volume may comprise evaluating the running list of modified blocks maintained by the process 300 while in incremental tracking mode. In embodiments that use the data structure Changed_Blocks, step 306 can comprise updating Changed_Blocks to include a list of each block that was changed after said each block was copied to the target volume. Said another way, Changed_Blocks can be updated to identify each block in the source volume whose corresponding copy in the target volume is now outdated.

In some cases, no blocks may be identified in step 306. This may be because no blocks were written to by the operating system during step 304. Or, alternatively, this may be because some blocks were written to by the operating system during step 304, but all such blocks were modified before they were copied to the target volume (e.g., the target volume already includes the most up-to-date version of the modified blocks). In these cases, process 300 may end at step 306 without proceeding to step 308.

At step 308, process 300 determines whether the aggregate size of all the blocks identified in step 306 is less than a threshold. The threshold may be a fixed aggregate size (e.g., expressed in units of storage such as megabytes, gigabytes, or terabytes), or may be a dynamic size calculated based on an available bandwidth between source volume and target volume, or the size of the source volume or target volume. For instance, the threshold may be calculated by determining the maximum amount of data that may be transferred from the source volume to the target volume within a pre-defined target maximum time, given the available bandwidth between the two volumes, or it may be calculated based on a pre-defined proportion of the total size of at least one of the source volume or target volume. In some embodiments, instead of comparing the aggregate size of the identified blocks against a size threshold, step 308 may compare the number of identified blocks against a numerical threshold (e.g., 500 blocks). If the number and/or aggregate size of all the blocks identified in step 306 is greater than or equal to the threshold, process 300 branches to step 310. If the aggregate size is less than the threshold, process 300 branches to step 312.

If process 300 branches to step 310, this means the aggregate size of all the changed blocks that were identified in step 306 is still relatively large. Process 300 then changes the designated blocks to be copied to include only the blocks identified in step 306. In embodiments that use the data structures Blocks_to_Copy and Changed_Blocks, this step can comprise updating Blocks_to_Copy so that it lists the same data blocks as the Changed_Blocks. Process 300 then branches back to step 304.

When process 300 loops back to step 304, process 300 once again copies the designated blocks from the source volume to the target volume, except this time the blocks that changed during the last copy procedure are copied. According to some embodiments, only the blocks that changed during the last copy procedure are copied. As discussed above, this can comprise copying each data block listed in Blocks_to_Copy to the target volume. In some embodiments, when process 300 loops back to step 304, process 300 once again copies the designated blocks from the source volume to the target volume, except this time only the blocks that changed during the last copy procedure are copied. In copying only the blocks that changed during the last copy procedure (e.g., only the blocks that are identified by Changed_Blocks and Blocks_to_Copy), other blocks that were previously copied to the target volume are not disturbed. Instead, only those blocks in the target volume that are known to be outdated are updated to reflect these blocks' new contents.

After completing step 304, process 300 again branches to step 306, where process 300 once again identifies blocks that were changed during the last copy procedure (e.g., the second time through step 304). In embodiments that use the data structure Changed_Blocks, this can comprise updating Changed_Blocks to include only those data blocks that changed during the last copy procedure (e.g., the second time through step 304). After completing step 306, process 300 once again branches to step 308.

If the rate at which data is being copied from the source volume to the target volume exceeds the rate at which data is being changed in the source volume by the operating system, the number and/or aggregate size of the blocks that are identified in step 306 should generally decrease each time process 300 loops through steps 304, 306, 308, and 310. With each loop, process 300 checks at step 308 whether the aggregate size of the blocks identified in step 306 (e.g., the aggregate size of the blocks listed in Changed_Blocks) is less than the aforementioned threshold. If not, process 300 loops through steps 310, 304 and 306 again. If yes, process 300 exits the loop and branches to step 312.

During steps 302, 304, 306, 308 and 310, the operating system writing to the source volume does not operate in copy-on-write mode. However, at step 312, process 300 enters copy-on-write mode. As discussed above, in copy-on-write mode, the operating system intercepts every write instruction to the source volume before the write occurs. The operating system determines, for every write, whether the write will modify a block of the source volume that has not yet been copied to the target volume. If the to-be-modified block has already been copied to the target volume, the operating system can allow the write to proceed. If the to-be-modified block has not yet been copied, the operating system can copy the original contents of the to-be-modified block to a "copy-on-write file" or CoW_File, thereby preserving the original contents of the block before it is modified by the write. The Cow_File is generally not part of the source volume being copied, but is a file stored outside of the source volume. As discussed above, the CoW_File can be stored on a separate part of a physical storage device (e.g., hard-drive) that holds all or part of the source volume, or on an entirely separate physical storage device. After the original contents of the to-be-modified block have been safely copied to the Cow_File, the operating system can allow the write instruction to modify the block.

At step 314, process 300 copies the identified blocks (e.g., blocks identified the last time through step 306, or the blocks listed in Changed_Blocks) to the target volume. As process 300 copies each identified block in turn, process 300 determines whether each identified block was modified by the operating system since the operating system entered copy-on-write mode. If not, process 300 copies the identified block from the source volume to the target volume. If yes, process 300 copies the original version of the identified block, as preserved in the CoW_File, to the target volume. A time associated with the time at which the operating system entered the copy-on-write mode can be used as a designation for the time at which the copy is crash consistent. For example, the time designation of the copy can be the hour, minute, second the CoW mode was entered, stated to a desired time resolution. According to some embodiments, some function of that entry time could be used for the designation. Such functions include but are not limited to the time of the last write event before the CoW process commenced, a fixed time before CoW commenced.

By the end of step 314, the target volume contains a crash-consistent copy of the source volume. The copy in the target volume reflects the state of the source volume at the time when process 300 entered copy-on-write mode in step 312, and not the state of the source volume at the time when process 300 began in step 302. By delaying the time at which the operating system enters copy-on-write mode, process 300 improves the performance of the computer systems in backup networks 100, 100B in several ways. First, process 300 decreases the amount of time that the operating system writing to the source volume (e.g., the operating system of client devices 103a, 104a, 103b, 104b) has to stay in copy-on-write mode. By decreasing the amount of time spent in copy-on-write mode, process 300 decreases the number of CoW-related writes to a CoW file that the operating system needs to perform, thereby decreasing the performance burden on the operating system. Second, by decreasing the amount of time spent in copy-on-write mode, process 300 decreases the amount of storage that must be reserved for a CoW file. This frees up processing and storage resources for other applications, thereby allowing client devices to perform faster and more efficiently.

Example C code for implementing process 300 is provided below:

```
// main logic of the copy process:
    ret = start_tracking(source_device, mount_point, &cow);
    if (ret != 0) {
        return 1;
    }
    uint64_t how_much_copied = 0;
    while (1) {
        /* initial copy of all blocks (or all allocated blocks) */
        ret = copy_identified_blocks (url, source_device, last_cow,
&how_much_copied); // no tracking file to work with, copy
everything
        if (ret != 0) {
            return 1;
        }
        if (how_much_copied > 500) // if the threshold has been
surpassed, do it again
```

```
        { // atomically get the current tracking data, put it aside, and
    clear the tracking data list for the next sweep
            ret = reset_tracking(mount_point, &cow);
            if (ret != 0) {
              return 1;
            }
            continue;
        }
        break;
    }
    /* so now we've done a number of sweeps of live data to the
    point where our last sweep
     * did less than 500 blocks, now take a real snapshot and do one
    last copy. */
        ret = make_snapshot(mount_point, &cow); // transition to
    snapshot only
        if (ret != 0) {
          return 1;
        }
        // copy from source volume or from CoW file, as appropriate
        char snapname[1000];
        sprintf(snapname, "/dev/datto%d", MEGA_MINOR);
        ret = copy_identified_blocks(url, snapname, last_cow,
    &how_much_copied);
        if (ret != 0) {
          return 1;
        }
    // end of main logic process.
```

Example C code for copying identified blocks based on incremental tracking data is provided below:

```
int copy_identified_blocks(char *url, char *device, char *tracking,
uint64_t *how_much_copied)
{
  fdlive = open_direct(device, O_RDONLY);
  snap_size = lseek(fdlive, 0, SEEK_END);
  total_blocks = (snap_size + COW_BLOCK_SIZE - 1) /
COW_BLOCK_SIZE;
  total_chunks = (total_blocks + INDEX_BUFFER_SIZE - 1) /
INDEX_BUFFER_SIZE;
  lseek(fdlive, 0, SEEK_SET);
  mappings = (uint64_t *)mymalloc(INDEX_BUFFER_SIZE *
sizeof(uint64_t));
  for (i = 0; i < total_chunks; i++) {
    blocks_to_read = MIN(INDEX_BUFFER_SIZE, total_blocks -
blocks_done);
    if (tracking != NULL) {
      //read a chunk of incremental tracking data
      bytes = pread(fdcow, mappings, blocks_to_read *
sizeof(uint64_t),
        COW_HEADER_SIZE + (INDEX_BUFFER_SIZE *
sizeof(uint64_t) * i));
      if (bytes != blocks_to_read * sizeof(uint64_t)) {
        goto error;
      }
    }
    //copy blocks where the incremental tracking says something
was written
    for (j = 0; j < blocks_to_read; j++) {
      if (tracking != NULL) {
        if (!mappings[j])
          continue;
      }
      ret = copy_block(url, fdlive, (INDEX_BUFFER_SIZE * i) +
j);
      if (ret) {
        goto error;
      }
      (*how_much_copied)++;
    }
    blocks_done += blocks_to_read;
  }
}
```

Figure 4A:
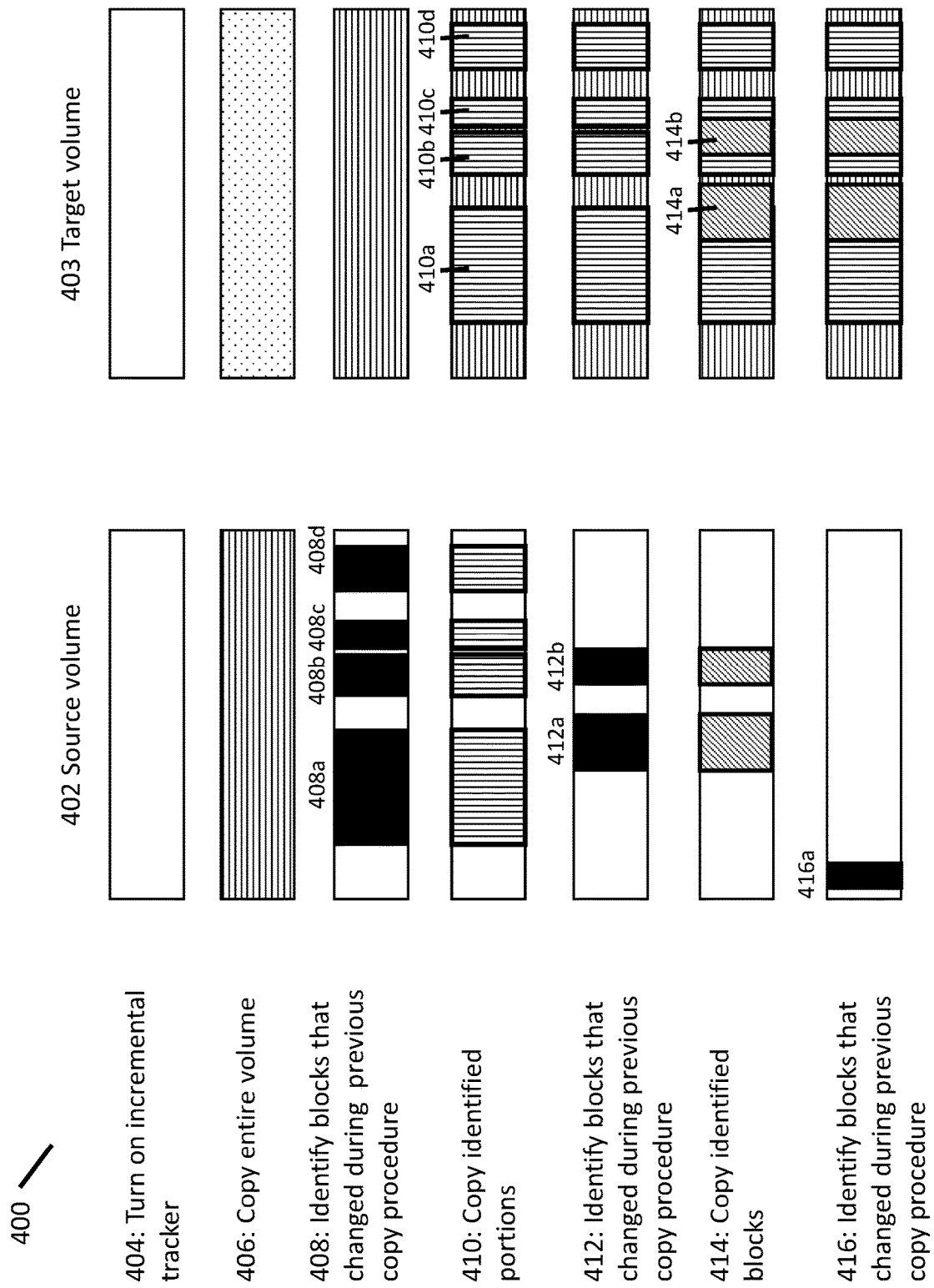
FIGS. 4A and 4B depict an exemplary process for copying a particular source volume to a target volume, according to some embodiments.

FIG. 4A depicts an exemplary process 400 for copying a source volume 402 to a target volume 403 that illustrates principles of process 300. As discussed above, source volume 402 may be managed by an operating system (not shown) that continues to make writes to the source volume 402 during the entire copying process. Therefore, there is no need to take source volume offline while the copying process is ongoing.

At step 404, process 400 begins when the operating system managing the source volume 402 enters an incremental tracking mode. As discussed above, the incremental tracking mode keeps track of which blocks have been modified by the operating system, and potentially the time and/or sequence in which these modifications took place.

At step 406, process 400 begins copying every allocated block in the entire source volume 402 to the target volume 403. This process may comprise a software loop that copies each block in the source volume 402 to the target volume 403 according to a predetermined sequence until there are no more blocks in the source volume 402 to be copied. For simplicity of explication, FIG. 4A and the subsequent explanation below assumes that the entire source volume 402 is being copied to the target volume 403 in step 406. However, it should be understood that, in some embodiments, only the portion of the source volume that has been allocated by the operating system may be copied in this step; in other embodiments, the entire source volume (whether allocated or not) may be copied. Depending on the size of the source volume 402 and the available bandwidth between source volume 402 and target volume 403, the process of copying the entire source volume 402 to the target volume 403 may take a considerable amount of time (e.g., multiple minutes, hours, or even days).

At step 408, process 400 verifies that the process of copying the entire source volume 402 to the target volume 403 is complete. At this point, the copying process evaluates records, logs, or data generated and/or modified by the operating system while in incremental tracking mode and identifies the blocks that changed during the previous copy procedure, i.e., the copy procedure of step 406. In some embodiments, the identified blocks include each block that was modified by write instructions after said each block had been copied to target volume 403. As illustrated in FIG. 4A, these identified blocks include the blocks at regions 408a, 408b, 408c, and 408d in the source volume.

At step 410, process 400 determines that the aggregate size of the blocks at regions 408a, 408b, 408c, and 408d is greater than or equal to a threshold. Process 400 therefore does not enter copy-on-write mode, but instead proceeds to copy only the blocks identified in step 408 (i.e., 408a, 408b, 408c, and 408d) to the corresponding locations in target volume 403. As a result, the portions 410a, 410b, 410c, and 410d in target volume 403, which correspond to the identified regions 408a, 408b, 408c and 408d in the source volume 402, are updated to reflect the new state of these identified regions. If the rate at which data is being copied from source volume 402 to target volume 403 exceeds the rate at which data in source volume 402 is being changed by the operating system, the aggregate size of the identified regions 408a, 408b, 408c, and 408d should be smaller than the size of the entire source volume 402. Therefore, the copying process of step 410 will generally take less time than the copying process of step 406.

At step 412, process 400 verifies that the process of copying the blocks identified in step 408 is complete. At this point, the copying process again evaluates the records, logs, or data generated and/or modified by the operating system while in incremental tracking mode and identifies the blocks that changed during the previous copy procedure, i.e., the copy procedure of step 410. In some embodiments, the identified blocks can include each block that was modified by write instructions after said each block had been copied to target volume 403. As illustrated in FIG. 4A, these identified blocks include the blocks at regions 412a and 412b in the source volume.

At step 414, process 400 determines that the aggregate size of the blocks at regions 412a and 412b is greater than or equal to a threshold. Process 400 therefore does not enter copy-on-write mode, but instead proceeds to copy only the blocks identified in step 412 (i.e., 412a and 412b) to the corresponding locations in target volume 403. As a result, the portions 414a and 414b in target volume 403, which correspond to the identified regions 412a and 412b, are updated to reflect the new state of these identified regions. If the rate at which data is being copied from source volume 402 to target volume 403 exceeds the rate at which data in source volume 402 is being changed by the operating system, the aggregate size of the identified regions 412a and 412b should be smaller than the aggregate size of the regions 408a, 408b, 408c, and 408d identified in step 408.

At step 416, process 400 verifies that the process of copying the blocks at regions 412a and 412b is complete. At this point, the copying process again evaluates the records, logs, or data generated and/or modified by the operating system while in incremental tracking mode and identifies the blocks that changed during the previous copy procedure, i.e., the copy procedure of step 414. As illustrated in FIG. 4A, these identified blocks include the blocks at region 416a.

Figure 4B:
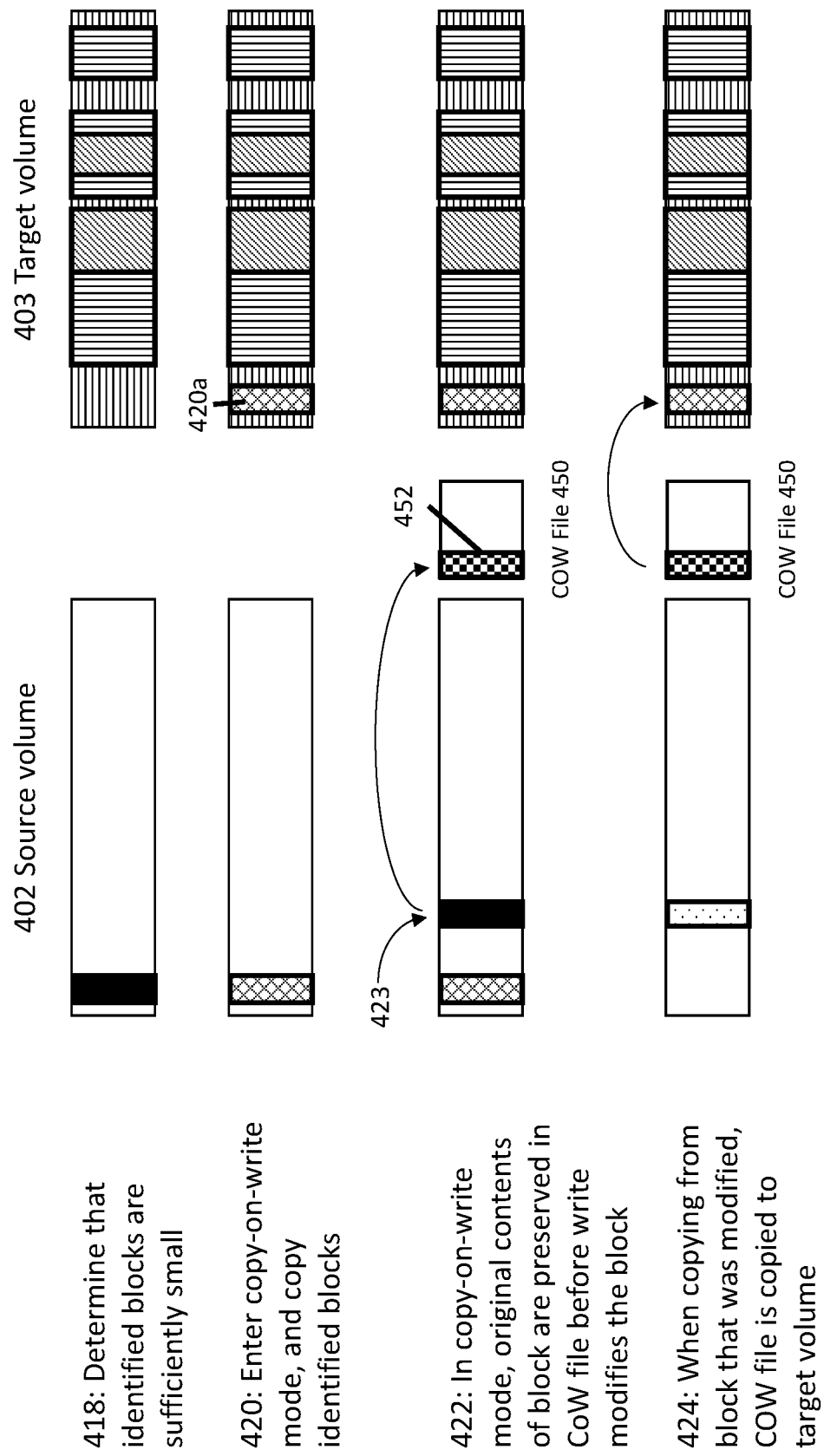

Turning to FIG. 4B, at step 418, process 400 determines that the aggregate size of the blocks at region 416 a is less than the threshold. As a result, process 400 enters copy-on-write mode in step 420, then begins the process of copying the identified blocks at 416a to the target volume.

The operation of copy-on-write mode is illustrated at step 422. While in copy-on-write mode, the operating system intercepts every write instruction (e.g., write 423) to the source volume before the write occurs. If the write would modify a block in source volume 402 that has not yet been copied to target volume 403, the original contents of the to-be-modified block can first be preserved in CoW file 450. For example, a copy of the original contents 452 can be stored in CoW file 450.

As illustrated in step 424, when process 400 attempts to copy a block that was modified by the operating system, process 400 can copy the original contents of that block (as preserved in CoW file 450) to the target volume. At the end of step 424, the target volume 403 contains a crash-consistent snapshot of source volume 402—this crash-consistent snapshot reflects the state of source volume 402 at the time that the operating system entered copy-on-write mode, in step 420. After the end of step 424, process 400 can optionally exit copy-on-write mode and turn off the incremental tracking mode.

As described above, the systems and methods taught herein can reduce the time spent in copy-on-write mode. This reduced time reduces the risk of unrecoverable problems that can occur during the copying process. For instance, in some embodiments, interruptions may occur in the copying process leading to a partial copy than cannot accurately completed. Interruptions can be of a particular concern when data is being copied directly to the cloud. This is because copying data to the cloud requires network transmission, which may be compromised or complicated in the evet of an interruption. Interruptions in the copying process occur due to a variety of factors or scenarios. During these scenarios, the copying process may or may not be running. For example, a breakdown in the network connection without causing a concurrent pause in the operation of the agent that is directing the copying. According to another exemplar scenario, the computer could be put to sleep or into a hibernation state, during which the network connection may break but during which the agent directing the copying is not running. According to another exemplary scenario, the backup agent could be stopped by the user, during which the network is still functional but the agent directing the copying is not running. According to another exemplary scenario, the computer on which the agent directing the copying resides may be shut down or rebooted (either cleanly or unexpectedly), during which the agent directing the copying may not be running but the network may still be functional. Other scenarios are contemplated.

The examples listed above can be broken up into two functional categories. In the first category, the agent directing the copying may be unaware that its operation was suspended. For example, when a computer hibernates, it may wake up in the same state it was in before hibernation. However, the network connection may have been broken during hibernation. In the second category, the agent directing the copying may be sufficiently aware of network failures (for example, that the software cannot connect to or communicate with can't talk to the server anymore) or other interruption causing event (for example shutdowns and restarts). Thus, in the first category, to the agent directing the backup, it appears as if there is a temporary network failure. In response, the agent may attempt to reconnect to the server and continue the backup as if the interruption didn't.

In the second category, during the interruption, the program continues to run and thus the agent can detect that the network connection was broken and attempts to reconnect to the server. In the case of the network disconnecting, the software may continue to try to connect to the server until a connection is re-established. In the case of shutdown or a restart of the computer running the software, the software may take note of the current state of the backup process and write the state of the backup to a disk. Accordingly, at the next restart, this state can be read from the disk and the system may reconnect to the server and continue sending data where it left off. This may also include recreating the snapshot the system was in the process of creating when in snapshot mode, as opposed to incremental tracking mode.

Figure 5:
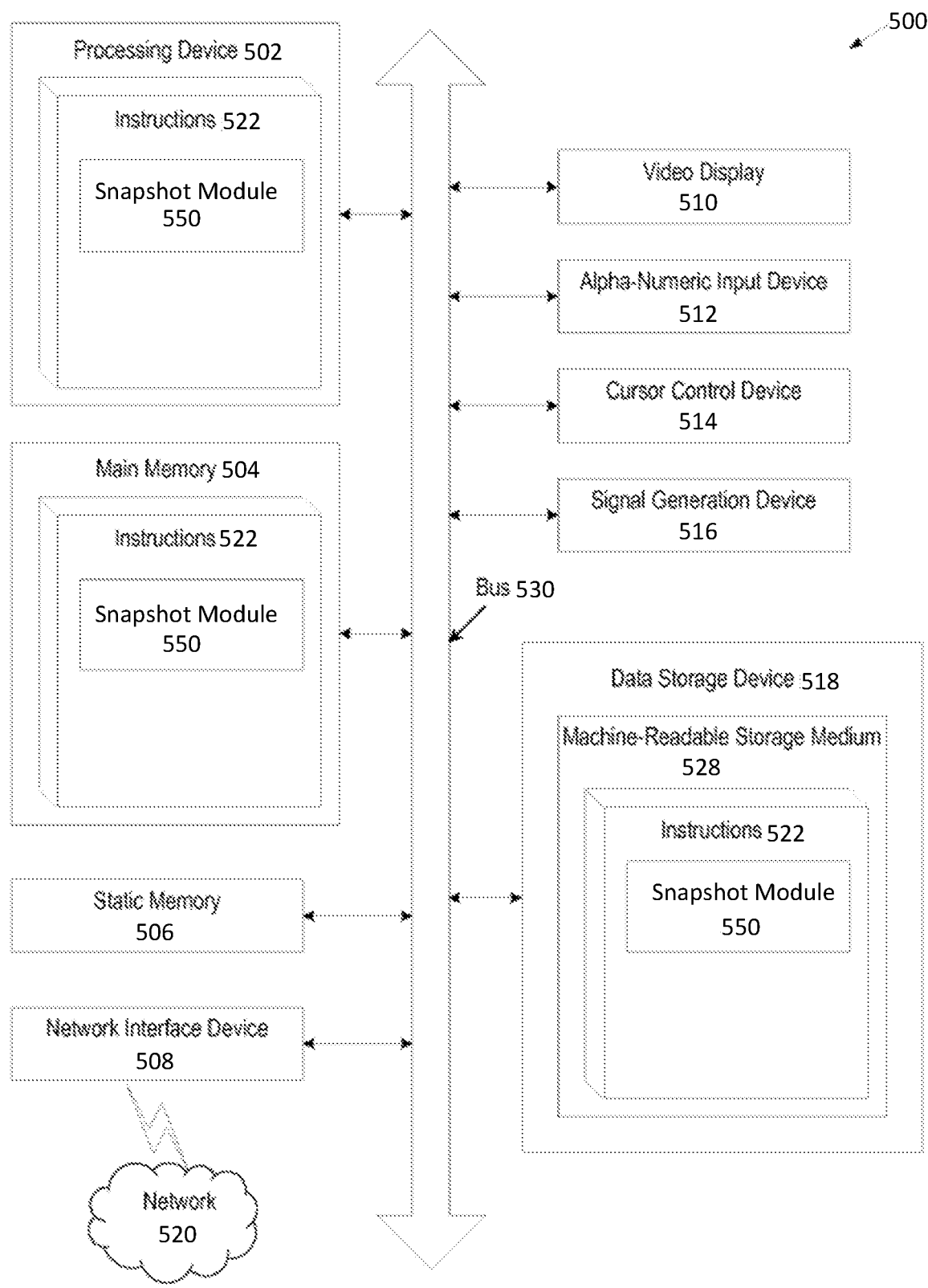
FIG. 5 illustrates an example machine of a computer system within which a set of instructions, for causing the machine to perform any one or more of the methodologies discussed herein, may be executed.

FIG. 5 illustrates an example machine of a computer system 500 within which a set of instructions, for causing the machine to perform any one or more of the methodologies discussed herein, may be executed. For example, client devices (e.g., 103a, 104a, 103b, 104b), backup aggregators (e.g., 102a, 102b), master server 110, and/or StorageServers A-F (e.g., 111a, 111b) may be implemented on machines similar to computer system 500. According to various embodiments, the machine may be connected (e.g., networked) to other machines in a LAN, an intranet, an extranet, and/or the Internet. The machine may operate in the capacity of a server (e.g., master server 110) or a client machine (e.g., client devices 103a, 104a, 103b, 104b, or backup aggregators 102a, 102b) in a client-server network environment, or as a peer machine in a peer-to-peer (or distributed) network environment (e.g., StorageServers A-F, e.g., 111a, 111b).

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, a graphical processing unit (GPU), or the like. The processing device 502 is configured to execute instructions 522 for performing the operations and steps discussed herein.

The computing system 500 may further include a network interface device 508. The computing system 500 also may optionally include a video display unit 510 (e.g., a liquid crystal display (LCD), Light Emitting Diode (LED) monitor, or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium 528 (also known as a computer-readable medium) on which is stored one or more sets of instructions 522 or software embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting machine-readable storage media.

In one implementation, the instructions 522 include instructions for a snapshot module 550, and/or a software library containing methods that can be called by the snapshot module 550. The instructions in the snapshot module 550 and/or the software library may be used to implement processes 300 and 400, as described above in relation to FIGS. 3, 4A and 4B. While the machine-readable storage medium 528 is shown in an example implementation to be a single medium, the term "machine-readable storage medium" includes a single medium or multiple media (e.g., a centralized or distributed database, and/or associated caches and servers) that store the one or more sets of instructions. The term "machine-readable storage medium" also includes any medium that is capable of storing or encoding a set of instructions for execution by the machine and that cause the machine to perform any one or more of the methodologies of the present disclosure. The term "machine-readable storage medium" accordingly includes, but is not limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulation of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "encoding" or "performing" or "dividing" or "setting" or "adding" or "locating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

The invention claimed is:

1. A method for copying a source volume comprising multiple blocks to a target volume while an operating system is configured to write to the source volume, the method comprising:
   (a) designating a set of one or more blocks to be copied from the source volume to the target volume;
   (b) copying the designated set of one or more blocks from the source volume to the target volume while the operating system is configured to write to the source volume;
   (c) identifying blocks of the source volume that were written to by the operating system while the operating system was configured to write to the source volume during step (b);
   (d) if one or more blocks were identified in step (c), comparing an aggregate size of the identified one or more blocks to a threshold, wherein:
      (d)(i) if the aggregate size is greater than or equal to the threshold:
         changing the designated set of one or more blocks to be copied from the source volume to the target volume to include only one or more of the identified one or more blocks, and
         repeating steps (b), (c), and (d);
      (d)(ii) if the aggregate size is below the threshold:
         causing the operating system to enter a copy-on-write mode, in which contents of a block of the source volume that is targeted by a write instruction from the operating system are preserved in a copy-on-write file before the write instruction modifies the contents of the targeted block included in the source volume;
         bringing the target volume into a crash-consistent state consistent with a state of the source volume at a single point in time associated with the time the copy-on-write mode was entered by the operating system, wherein, after the operating system enters the copy-on-write mode, the method copies only one or more of the blocks identified in a last iteration of step (c) from the source volume to the target volume if the blocks identified in the last iteration of step (c) were not written to by the operating system while in copy-on-write mode prior to copying the blocks identified in the last iteration of step (c), and, if the blocks identified in the last iteration of step (c) were written to by the operating system while in cony-on-write mode prior to copying the blocks identified in the last iteration of step (c), the method copies only one or more of the blocks identified in the last iteration of step (c) from the copy-on-write file to the target volume,
   wherein the operating system refrains from entering the copy-on-write mode during steps (a), (b), (c), and (d)(i).

2. The method of claim 1, wherein the method concludes if no blocks were identified in step (c).

3. The method of claim 1, wherein designating the set of one or more blocks to be copied from the source volume to the target volume in step (a) comprises designating at least one of (i) all allocated blocks in the source volume, and (ii) all blocks in the source volume.

4. The method of claim 1, further comprising designating a set of excluded blocks in the source volume, wherein the designating the set of one or more blocks to be copied from the source volume to the target volume in step (a) comprises excluding the excluded blocks from the designated set of one or more blocks to be copied from the source volume to the target volume.

5. The method of claim 1, further comprising:
   receiving, during step (b), an indication that the operating system has written to a block of the source volume;
   determining, during step (b), whether the written-to block has already been copied to the target volume;
   if the written-to block has already been copied to the target volume, adding an identifier corresponding to the written-to block to a list of modified blocks; and
   if the written-to block has not already been copied to the target volume, refraining from adding the identifier corresponding to the written-to block to the list of modified blocks,
   wherein step (c) comprises evaluating said list of modified blocks.

6. The method of claim 5, wherein the evaluating said list of modified blocks comprises identifying the file types associated with at least one of the modified blocks and determining if said file type is designated to be copied.

7. The method of claim 1, further comprising:
   receiving, during step (b), an instruction from the operating system to write to a block of the source volume; and
   adding an identifier corresponding to the written-to block to a list of modified blocks,
   wherein step (c) comprises evaluating said list of modified blocks.

8. The method of claim 7, wherein the evaluating said list of modified blocks comprises identifying the file types associated with at least one of the modified blocks and determining if said file type is designated to be copied.

9. The method of claim 1, wherein the threshold is determined based on a maximum number of blocks that may be transferred from the source volume to the target volume within a target maximum time.

10. The method of claim 1, wherein the threshold is determined based on a pre-defined proportion of a total size of at least one of the source volume and the target volume.

11. The method of claim 1, wherein the aggregate size of the identified one or more blocks is a numerical count of the identified one or more blocks, and the threshold comprises a number of blocks.

12. The method of claim 1, wherein the source volume is a client device and the target volume is a backup aggregator at a site local to the client device.

13. The method of claim 1, wherein the source volume is a client device and the target volume is a storage server at a cloud storage center remote from the client device.

14. The method of claim 1, wherein the source volume includes an image-based backup, and wherein the set of one or more blocks to be copied from the source volume to the target volume includes one or more blocks of the image-based backup.

15. The method of claim 1, wherein the target volume is a cloud storage volume.

16. The method of claim 1, wherein step (b) comprises sending the designated set of one or more blocks to the target volume via the internet.

17. A method for copying a source volume comprising multiple blocks to a cloud storage volume while an operating system is configured to write to the source volume, the method comprising:
(a) designating a set of one or more blocks to be copied from the source volume to the cloud storage volume, wherein the source volume includes an image-based backup, and wherein the set of one or more blocks to be copied from the source volume to the cloud storage volume includes one or more blocks of the image-based backup;
(b) copying the designated set of one or more blocks from the source volume to the cloud storage volume while the operating system is configured to write to the source volume by sending the designated stet of one or more blocks to the cloud storage volume via the internet;
(c) identifying blocks of the source volume that were written to by the operating system while the operating system was configured to write to the source volume during step (b);
(d) if one or more blocks were identified in step (c), comparing an aggregate size of the identified one or more blocks to a threshold, wherein:
(d)(i) if the aggregate size is greater than or equal to the threshold:
changing the designated set of one or more blocks to be copied from the source volume to the cloud storage volume to include only one or more of the identified one or more blocks, and
repeating steps (b), (c), and (d);
(d)(ii) if the aggregate size is below the threshold:
causing the operating system to enter a copy-on-write mode, in which contents of a block of the source volume that is targeted by a write instruction from the operating system are preserved in a copy-on-write file before the write instruction modifies the contents of the targeted block included in the source volume;
bringing the cloud storage volume into a crash-consistent state consistent with a state of the source volume at a single point in time associated with the time the copy-on-write mode was entered by the operating system, wherein, after the operating system enters the copy-on-write mode, the method copies only one or more of the blocks identified in a last iteration of step (c) from the source volume to the cloud storage volume if the blocks identified in step (c) were not written to by the operating system while in copy-on-write mode prior to copying the blocks identified in the last iteration of step (c), and, if the blocks identified in the last iteration of step (c) were written to by the operating system while in coy-on-write mode prior to copying the blocks identified in the last iteration of step (c), the method copies only one or more of the blocks identified in the last iteration of step (c) from the copy-on-write file to the cloud storage volume,
wherein the operating system refrains from entering the copy-on-write mode during steps (a), (b), (c), and (d)(i).

18. The method of claim 17, wherein designating the set of one or more blocks to be copied from the source volume to the cloud storage volume in step (a) comprises designating at least one of (i) all allocated blocks in the source volume, and (ii) all blocks in the source volume.

19. The method of claim 17, further comprising:
receiving, during step (b), an indication that the operating system has written to a block of the source volume;
determining, during step (b), whether the written-to block has already been copied to the cloud storage volume;
if the written-to block has already been copied to the cloud storage volume, adding an identifier corresponding to the written-to block to a list of modified blocks; and
wherein step (c) comprises evaluating said list of modified blocks.

20. The method of claim 19, wherein the evaluating said list of modified blocks comprises identifying the file types associated with at least one of the modified blocks and determining if said file type is designated to be copied.

21. The method of claim 17, wherein the threshold is determined based on a maximum number of blocks that may be transferred from the source volume to the target volume within a target maximum time.

22. The method of claim 17, wherein the aggregate size of the identified one or more blocks is a numerical count of the identified one or more blocks, and the threshold comprises a number of blocks.

23. The method of claim 17, wherein the source volume is a client device and the cloud storage volume is a storage server at a cloud storage center remote from the client device.

24. The method of claim 17, wherein the source volume includes an image-based backup, and wherein the set of one or more blocks to be copied from the source volume to the cloud storage volume includes one or more blocks of the image-based backup.

25. The method of claim 17, wherein step (b) comprises sending the designated stet of one or more blocks to the cloud storage volume via the internet.

* * * * *